Nov. 2, 1971 W. J. QUINLAN ET AL 3,616,485
DETACHABLE WINDSHIELD WIPER BLADE UNIT
Filed Dec. 10, 1969 4 Sheets-Sheet 4

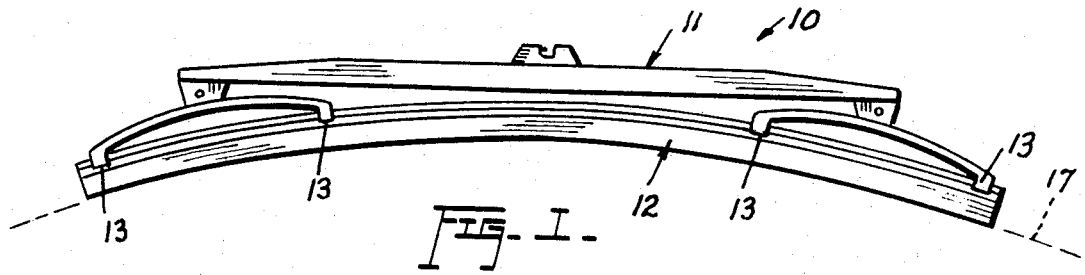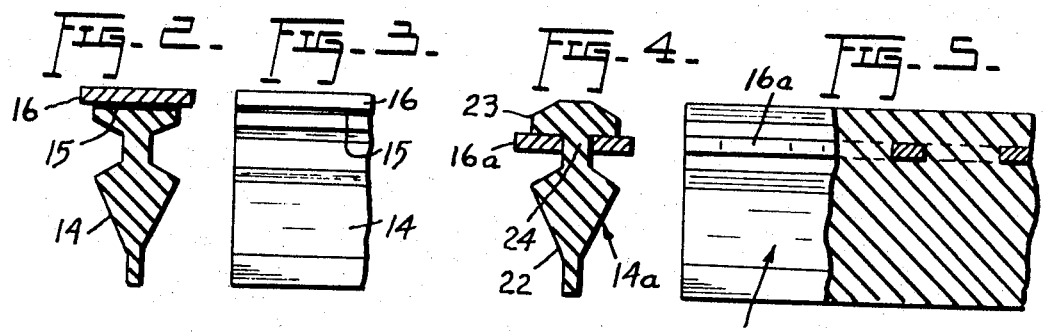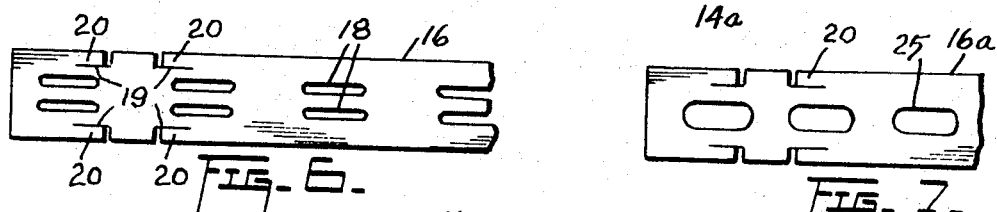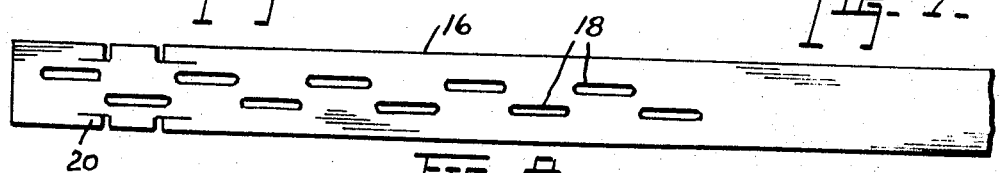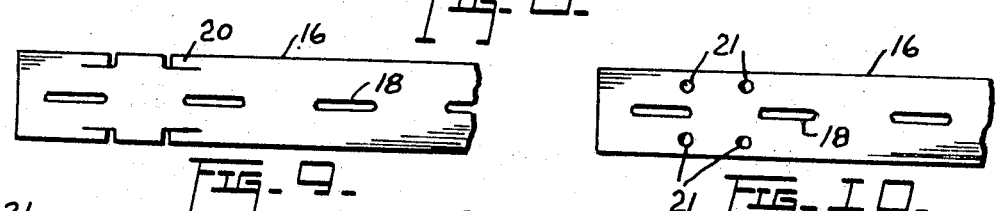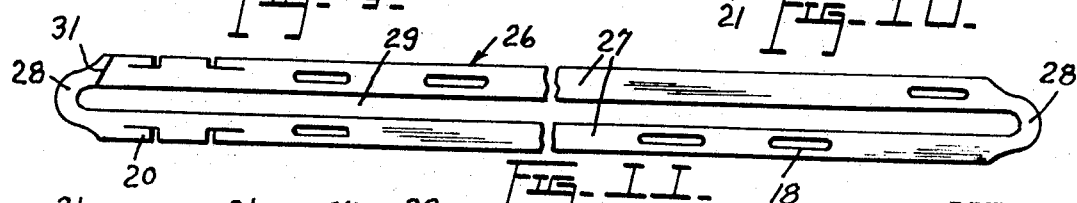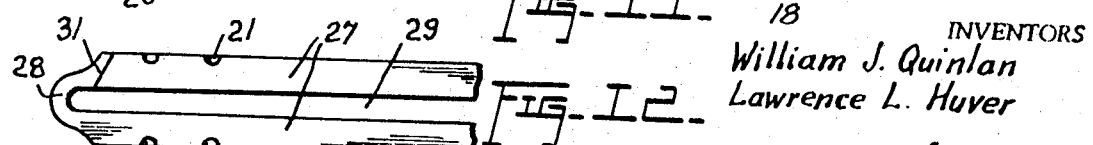
INVENTORS
William J. Quinlan
Lawrence L. Huver
BY Munson H. Lane
ATTORNEY

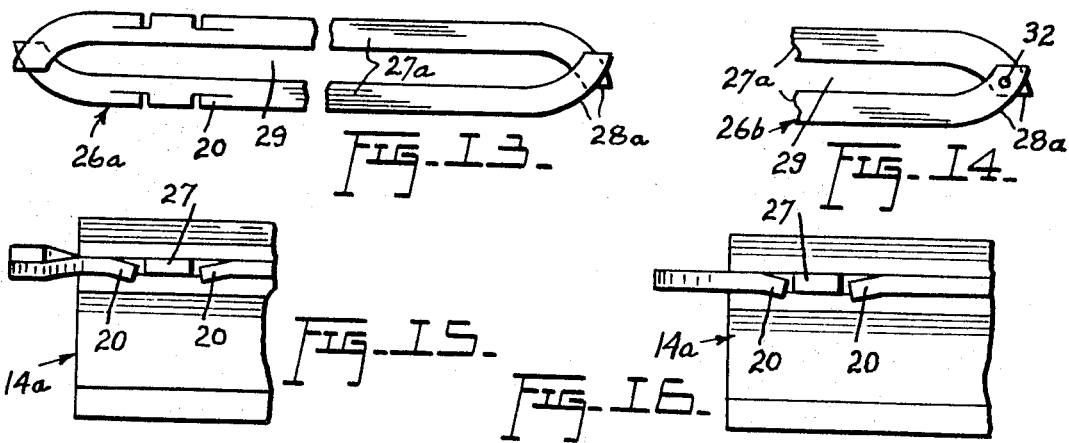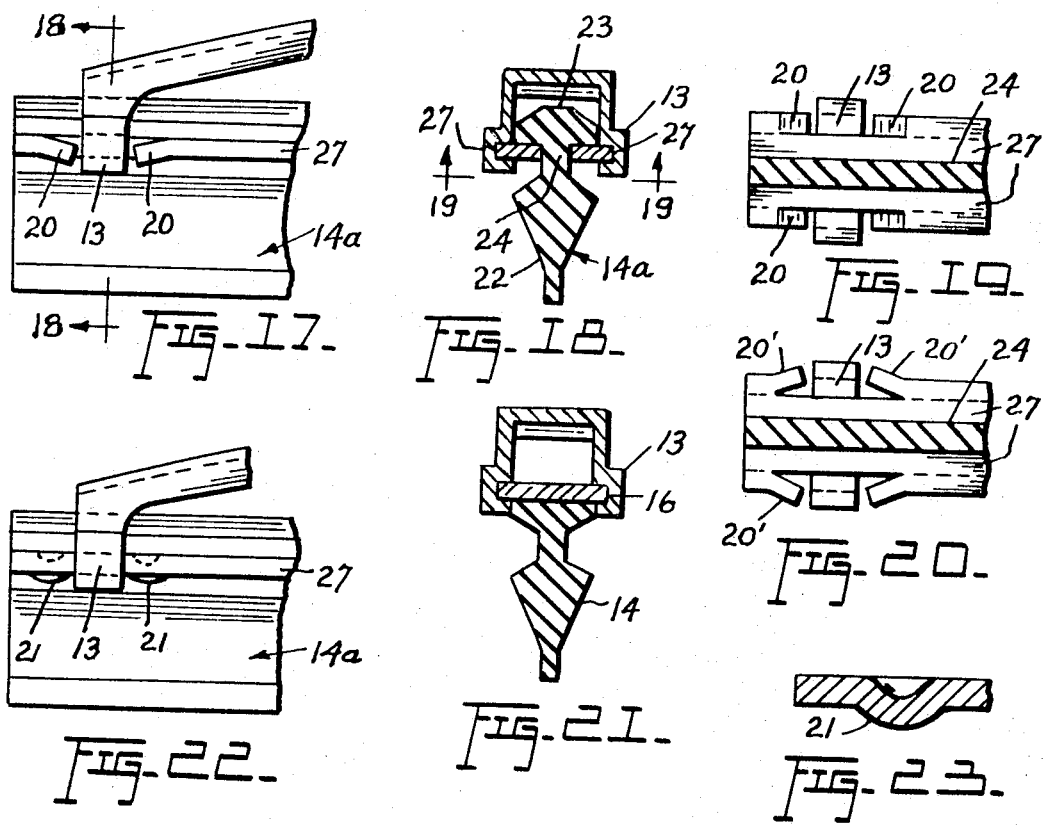

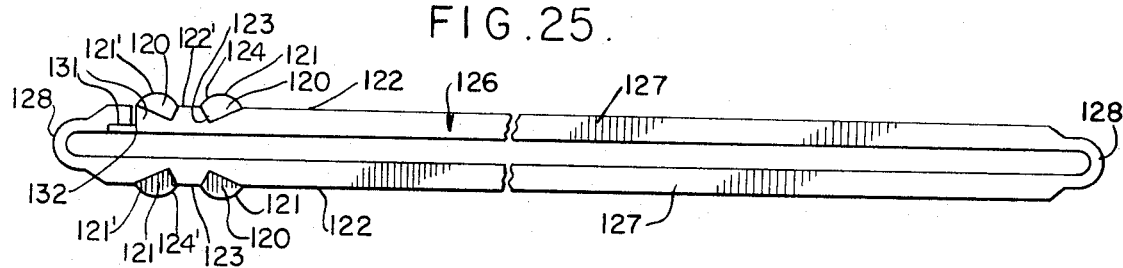
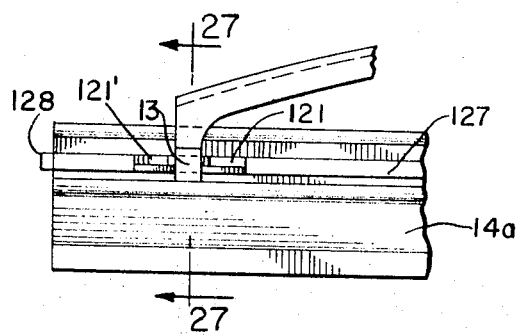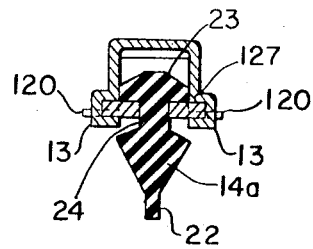
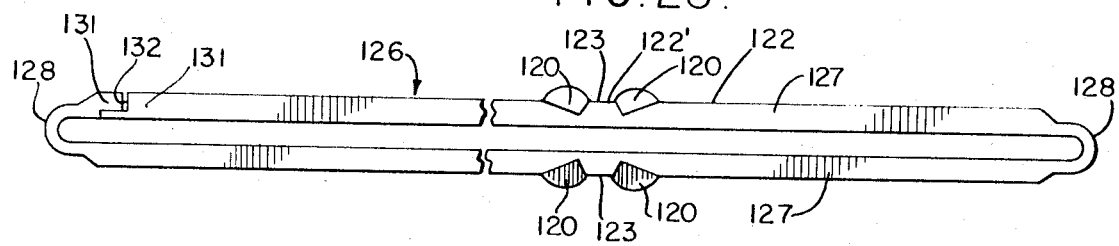
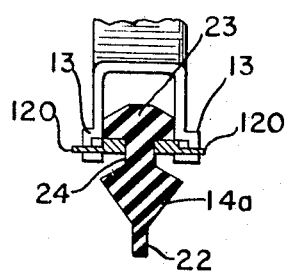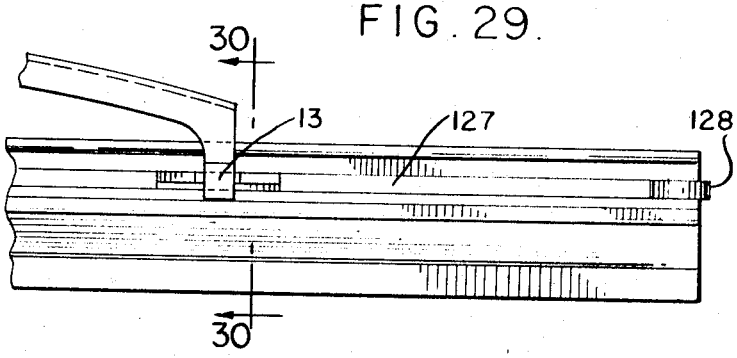

INVENTORS
William J. Quinlan &
Lawrence L. Huver

BY Munson H. Lane

ATTORNEY

United States Patent Office 3,616,485
Patented Nov. 2, 1971

3,616,485
DETACHABLE WINDSHIELD WIPER BLADE UNIT
William J. Quinlan and Lawrence L. Huver, Hastings, Mich., assignors to Hastings Manufacturing Company, Hastings, Mich.
Continuation-in-part of application Ser. No. 725,325, Apr. 30, 1968. This application Dec. 10, 1969, Ser. No. 883,928
Int. Cl. B60s 1/02
U.S. Cl. 15—250.42                    10 Claims

ABSTRACT OF THE DISCLOSURE

A flexible wiper element supported by a resiliently flexible backing strip. In some embodiments the wiper element and backing strip are bonded together. In other embodiments the backing strip includes a pair of transversely spaced strip members which retain the wiper element therebetween. Longitudinal edge portions of the backing strip are embraced by the usual claws of a wiper pressure unit, and longitudinally spaced detents are provided on the backing strip to releasably or snap-fittingly receive one of the claws between them, whereby to releasably hold the blade unit and pressure unit in assembled relation.

The present application is a continuation-in-part of our application Ser. No. 725,325, filed Apr. 30, 1968, now Pat. No. 3,541,629, granted Nov. 24, 1970.

The invention relates to new and useful improvements in windshield wiper blade assemblies of the flexible type such as may be used on either flat or curved windshields, and in particular the invention concerns itself with certain improvements in blade assemblies utilizing a pressure unit with a detachable blade unit.

An object of the invention is to provide a detachable blade unit which may be quickly and easily applied to or removed from the pressure unit and which is dependably held in assembled relation with the pressure unit without the use of separate parts such as clips, springs, screws, or the like, so that there is no possibility of such separate parts becoming lost while the blade unit is being replaced.

Another important object of the invention is to provide an improved blade unit consisting of a flexible wiper element supported by a resiliently flexible backing strip in such manner that the action of the pressure unit on the backing strip assures a proper wiping contact of the full length of the wiper element with either a flat or a curved windshield.

Another object of the invention is to provide the blade unit with a blade backing strip of novel construction which may be easily and economically manufactured and readily assembled with the wiper element.

The application discloses a flexible wiper element supported by a resiliently flexible backing strip. In some embodiments the wiper element and backing strip are bonded together. In other embodiments the backing strip includes a pair of transversely spaced strip members which retain the wiper element therebetween. Longitudinal edge portions of the backing strip are embraced by the usual claws of a wiper pressure unit, and longitudinally spaced detents are provided on the backing strip to releasably or snap-fittingly receive one of the claws between them, whereby to releasably hold the blade unit and pressure unit in assembled relation.

The present application relates particularly to the blade backing strip which is provided with claw locking means comprising a pair of longitudinally spaced detents including inclined portions to facilitate entry of a claw of the pressure unit in either direction into the space between the detents, whereby the pressure unit is releasably locked in position. Preferably means are also provided to permit or facilitate removal of the claw from the locked position in either direction. In some cases spring detents are employed which may be depressed to permit removal of the claw; in other cases cam detent means are provided to facilitate such removal. In the present application the use of improved cam detent means is specifically claimed.

With the foregoing objects and features in view and such other objects and features as may become apparent as this specification proceeds, the invention will be understood from the following description taken in conjunction with the accompanying drawings, wherein like characters of reference are used to designate like parts, and wherein:

FIG. 1 is a side elevational view of a blade assembly including a pressure unit and a blade unit;

FIG. 2 is an enlarged cross-sectional view of one embodiment of the blade unit;

FIG. 3 is a fragmentary side elevational view of the blade unit shown in FIG. 2;

FIG. 4 is a cross-sectional view of another embodiment of the blade unit;

FIG. 5 is a fragmentary view, partly in side elevation and partly in longitudinal section of the blade unit of FIG. 4;

FIG. 6 is a fragmentary plan view of the backing strip used in the blade unit of FIG. 2;

FIG. 7 is a fragmentary plan view of the backing strip used in the blade unit of FIG. 4;

FIG. 8 is a fragmentary plan view of another embodiment of the backing strip;

FIG. 9 is a fragmentary plan view of another embodiment;

FIG. 10 is a fragmentary plan view of another embodiment;

FIG. 11 is a plan view showing another modification of the backing strip;

FIG. 12 is a fragmentary plan view of another modification;

FIG. 13 is a plan view of still another modification;

FIG. 14 is a fragmentary plan view of another modification;

FIG. 15 is a fragmentary side elevational view of a blade unit using the backing strip of FIG. 13;

FIG. 16 is a fragmentary side elevational view of a blade unit using the backing strip of FIG. 11;

FIG. 17 is a fragmentary side elevational view showing a claw of the pressure unit applied to a blade unit utilizing spring detents on the backing strip;

FIG. 18 is a cross-sectional view, taken substantially in the plane of the line 18—18 in FIG. 17;

FIG. 19 is a fragmentary sectional view, taken substantially in the plane of the line 19—19 in FIG. 18;

FIG. 20 is a view similar to that in FIG. 19 but showing a modified arrangement of the spring detents;

FIG. 21 is a view similar to that in FIG. 18 but with the blade unit of FIG. 2;

FIG. 22 is a fragmentary side elevational view showing a claw of the pressure unit applied to a blade unit utilizing boss type detents;

FIG. 23 is an enlarged fragmentary sectional detail of one of the boss type detents;

FIG. 24 is a developed plan view of the backing strip of FIGS. 11 or 12, showing the same on a reduced scale and prior to its bending into shape;

FIG. 25 is a plan view similar to FIG. 11 showing a blade backing strip, but provided with pairs of detents in the form of cams located near one end thereof and struck out from the material of the backing strip;

FIG. 26 is a fragmentary side elevation of a blade unit using the backing strip of FIG. 25;

FIG. 27 is a cross-section taken substantially in the plane of line 27—27 of FIG. 26;

FIG. 28 is a plan view similar to FIG. 25, but with the pairs of cam detents located farther from the ends of the blade than in FIG. 25;

FIG. 29 is a fragmentary side elevation of a blade unit showing the backing strip of FIG. 28;

FIG. 30 is a cross-section taken substantially in the plane of line 30—30 of FIG. 20.

Figure 31:
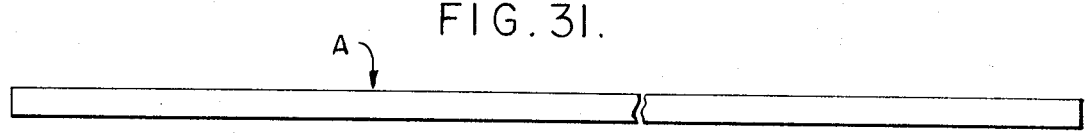
FIGS. 31–35 are diagrammatic views illustrating steps in the formation of the preferred type of backing strips.

Before describing the invention in detail it is to be noted that three basic types of the blade unit are disclosed, each embodying a different structural combination of a wiper element and backing strip. Moreover, different types of longitudinally spaced detents are disclosed for releasably holding a claw of the pressure unit assembled on a backing strip of the blade unit of any one of the three basic types, and several modifications of the backing strip are also disclosed, any one of which may utilize either of the two types of releasable detents. For sake of simplicity of illustration only a few of the possible combinations have been shown in the drawings and it should be understood that various other combinations are also possible.

Referring now to the accompanying drawings in detail, FIG. 1 shows a windshield wiper blade assembly 10 consisting of two basic units, namely, a pressure unit or super structure 11 and a blade unit or flexer assembly 12, the blade unit being detachably connected to the usual claws 13 of the pressure unit so that the blade unit may be easily replaced.

In accordance with this invention means are provided to facilitate assembly or disassembly of the blade or flexer unit as will be more fully set forth hereinafter.

One suitable type of blade or flexer unit which may be employed in accordance with the invention is shown in FIGS. 2, 3, 20 and 21, the same comprising an elongated, flexible wiper element 14 made of rubber, or the like, which may be adhesively bonded as at 15 to a backing strip 16. The backing strip, which may be made of metal, is resiliently flexible in a plane normal to its surfaces, but is substantially rigid against lateral or edgewise deflection. Thus, when the blade unit is applied to the pressure unit 11, the flexibility of the backing strip as stated permits the full length of the wiper element 14 to properly contact the windshield 17, regardless of whether the windshield is flat or has varying degrees of curvature.

The backing strip or flexer 16 may be imperforate, but in order to enhance its flexibility in a plane normal to its surfaces, the strip may be provided with a longitudinal row of perforations or slots 18 as shown in FIGS. 9 and 10. Alternatively, two or more rows of such perforations may be provided, and the perforations in the two or more rows may be either transversely aligned as shown in FIG. 6 or longitudinally staggered as shown in FIG. 8. Also, if greater flexibility is desired in the end portions of the strip than in the center portion thereof, the perforations may be provided only in the end portions and the center portion may be left imperforate, as shown in the right-hand end of FIG. 8.

It will be understood that various forms of perforations may be employed if desired in connection with any of the types of backing strip or flexer herein disclosed or such perforations may be omitted if desired without departing from the invention in its broadest aspect.

In any event, when the blade unit 12 is assembled to the pressure unit 11, the claws 13 of the pressure unit slidably engage the longitudinal edge portions of the backing strip 16 as will be apparent from FIG. 21, whereby the blade unit is free to flex in passing over the windshield contour while the longitudinal distance or spacing between the claws remains substantially the same. However, to prevent separation of the blade unit from the pressure unit by sliding, one of the pressure unit claws is anchored at a fixed point to the backing strip 16 of the blade unit by releasable detent means which holds the blade unit and pressure unit assembled but still permits the blade unit to be detached when desired for purposes of replacement. Any one of the several claws 13 of the pressure unit may be used for such anchoring purposes by providing the releasable detent means at an appropriate point along the length of the backing strip.

Various different, selectively usable types of detent means are disclosed, one of these being the spring detent type shown, for example, in FIGS. 6–11, 13 and 15–19. Here the longitudinal edge portions of the backing strip are formed with transversely aligned pairs of longitudinally spaced, substantially L-shaped slits 19 which are open at the edges of the strip and define two pairs of spring detents 20. These spring detents are angularly offset as is best shown in FIGS. 15–17 so as to project outside the cross-section of the backing strip in a direction normal to the strip surfaces, and the longitudinal spacing between the spring detents is substantially the same or slightly larger than the longitudinal dimension of the pressure unit claw 13 which is to be accommodated between the spring detents, as will be apparent from FIG. 17. When the blade unit is applied to the pressure unit, the claws 13 of the pressure unit are slid along the longitudinal edge portions of the backing strip until a selected one of the claws encounters a first pair of transversely aligned spring detents. The detents 20 have resilient characteristics which enable them to retract within the cross-section of the backing strip as the claw passes over them, whereupon they spring back to their normal, projected position and the claw is then retained in a seated or anchored position on portions of the backing strip between the two pairs of spring detents. Thus the blade unit is held assembled to the pressure unit and when the blade unit is to be replaced, a pair of the spring detents 20 are retracted to permit sliding of the claw outwardly from between the two pairs of detents and subsequent sliding separation of the blade unit from the pressure unit.

A slightly modified arrangement of the same type of spring detents is shown in FIG. 20, wherein the detents 20′, rather than being offset in a plane normal to the backing strip surfaces, are offset laterally or edgewise in the plane of the strip surfaces, but otherwise the action of the detents is the same as already described. In this figure the claw 13 is shown in locked position between the two sets of inclined spring fingers 20′, 20′. To remove the claw the spring fingers are depressed as described above.

A second type of releasable or snap-fitting detent means is shown, for example, in FIGS. 10, 12, 22 and 23. The same comprises transversely aligned, longitudinally spaced, concavo-convex bosses 21 which are formed at or closely adjacent to the longitudinal edges of the backing strip and project from one of the strip surfaces, as illustrated.

The longitudinal spacing of the detents 21 is substantially the same or slightly larger than the longitudinal dimension of the pressure unit claw 13 which is to be seated between the detents in a manner similar to the seating of the claw between the aforementioned detents 20 or 20′. However, the boss type detents 21 are not resilient in the same manner as the detents 20 or 20′, and thus the detents 21 are carefully proportioned in size and shape so that upon application of sliding pressure the claw may be forced over the detents which exert a cam action, either into a seated position between the detents when the blade unit is being installed, or out of its seated position when the blade unit is being removed. In any event, as in the instance of the spring detents 20 or 20′, the claw is passed into its seated position with a releasable or snap-fitting action which holds the parts assembled until they are manually separated, which is facilitated by the rounded configuration of the bosses 21.

The releasable detent means 20, 20′ or 21 may be provided in transversely aligned relation on both longitudinal edge portions of the backing strip, or such means may be provided on one longitudinal edge portion only, if so preferred.

A second type of blade unit which may be employed in accordance with the invention is shown in FIGS. 4 and 5. Here the wiper element 14a has a body portion 22, a crown portion 23 and a cross-sectionally reduced neck portion 24, and the backing strip 16a (FIG. 7) is provided with a longitudinal row of openings or slots 25 having the neck portion 24 of the wiper element extending therethrough. In manufacture, the wiper element 14a may be extruded in a conventional manner while the backing strip 16a is being fed through the extruder, so that the two components become unitized by bonding of the crown portion 23 and of the neck portion 24 to the backing strip. The openings 25 not only serve to accommodate the neck portion 24, but also enhance the resilient flexibility of the backing strip as already explained in connection with the slots 18.

The backing strip 16a of the blade unit in FIGS. 4, 5 and 7 may be provided with either the spring type detent means 20, 20', or the boss type snap-fitting detent means 21, as already mentioned.

Another type of blade assembly or unit of the invention is similar to the second type in that it also utilizes the wiper element 14a, but in this instance the wiper element is extruded by itself and is then installed in a separate backing strip of which several modifications are disclosed, as for example in FIGS. 11, 12, 13 and 14. The assembly is illustrated in FIGS. 15, 16, 17, 18, 19, 20 and 22.

The backing strip 26 of FIG. 11 is the preferred embodiment, the same including a pair of transversely spaced strip members 27 and a pair of closed end portions 28 which bridge the strip members together. The neck portion 24 of the wiper element 14a is received in the space 29 between the two strip members 27 and the end portions 28, disposed adjacent the ends of the wiper element 14a, prevent longitudinal sliding of the wiper element relative to the backing strip. Here again, the strip members 27 may be formed with openings 18 to enhance flexibility, and either the detent means 20, 20' or the detent means 21 may be provided on the strip members, as desired, as exemplified in FIGS. 11 and 12 respectively.

The backing strip 26 is preferably formed from a single, thin strip-like piece of material preferably metal such as stainless steel, shown in its developed form in FIG. 24 as more fully set forth hereinafter. Such a piece of material is then formed by bending in the region of the lines 30 to provide the end portions 28 when the backing strip assumes its closed configuration with the transversely spaced strip members 27, and manufacture of the stirp in this manner eliminates material waste such as would otherwise be involved if the space 29 were blanked out of a wider strip of material. It is to be particularly noted that when the terminal ends 31 of the material strip in FIG. 24 are brought together as in FIG. 11, they are left in an unattached, opposing relation, that is, without being secured together. This not only permits the strip portions 27 to be spread apart for purposes of insertion or removal of the wiper element 14a, but it also permits a certain amount of twisting of the wiper element at one side without transferring the load to the opposite side of the blade unit. The two free ends 31 are preferably cut at an angle which is oblique to the longitudinal axis, so that the ends may lie in abutting relationship without any overlap and assist each other in maintaining longitudinal alignment. It will be understood that the two strip members 27 are prevented from undue spreading laterally away from the neck portion 24 of the wiper element 14a by the embracing engagement of the pressure unit claws 13 therewith.

In forming the L-shape spring detents 20 the following operations may be performed:

(1) The flexer rail or backing strip 26 consisting preferably of a piece of stainless steel is placed in a die which first pierces a rectangular hole approximately .028 inch in width and .187 inch in length, through the flexer rail or strip and close the outside edge of the longitudinal strip leaving approximately .030 inch of stock between the hole and the edge of the strip.

(2) The next operation pierces the slot approximately .028 inch wides perpendicular to the first hole pierced and through the longitudinal edge strip; this removes the L portion from the rail, and the final operation angularly offsets the projections laterally approximately .030 inch beyond the edge of the longitudinal strip.

It will be understood that in FIG. 11 the detents 20 are shown before they are angularly offset and in FIGS. 15, 16 and 17 they are shown after the offsetting or bending operation. The detents may be formed either before or after the strip 26 has been bent to the form shown in FIG. 11.

FIG. 13 shows a modified backing strip 26a which may be used in place of the strip 26. In this instance the two strip members 27a are formed separately and include curved end portions 28a which are overlapped and suitably secured together, as by spot welding, for example, to form the closed ends of the backing strip. In another modification shown in FIG. 14, the overlapped strip member end portions 28a are secured together by a rivet 32.

A further embodiment of the invention is shown in FIG. 25 wherein spaced cam type detents 120, 120 are employed in connection with a backing strip 126 similar to the backing strip 26 of FIGS. 11, said strip comprising spaced longitudinal strip members 127 formed by bending from a single thin strip of metal and having a pair of closed end portions 128 which bridge the strips together. The terminal ends 131 are interfitted with a L-shaped or stepped connection 132.

The cam detents 120, 120 are generally similar in function and operation to the detents 20, 20' and 21 previously described in that they permit a claw 13 of the pressure unit to pass over one of said detents and enter the space between the detents where the claw is sustained in releasable locked position, from which locked position the claw may be removed by reverse action of the claw relative to the detents.

As shown in FIG. 25 the detents 120, 120 are arranged in oppositely spaced pairs near one end of the backing strip, though only one longitudinally spaced pair is required. Each pair of cam members 120 includes oppositely included leading cam edge portions 121 and 121' respectively sloping outwardly from the adjacent longitudinal edge portion 122 of the backing strip to permit entry of the claw 13 from either direction into the space 123 between the detents 120.

Each pair of cam detents also includes steeply inclined cam edge portions 124 and 124' sloping away from the longitudinal edge portion 122' within the space 123 to permit removal of the claw 13 from the locked position in either direction.

The pairs of detents 120, 120 are preferably formed integral with the edge portions 122 of the backing strip in any suitable manner. Specifically the backing strip or flexer is placed in a die and as the metal is compressed it is forced downwardly and outwardly. On continued application of pressure the cam becomes progressively thinner at its outer portion as the lateral distance from the strip is increased.

The shape of the cam detents 120 is important. When the flexer assembly or blade unit including the backing member or flexer strip carrying the detents is positioned in the superstructure or pressure unit 11 (FIG. 1), the claw 13 of the superstructure acts as a cam follower. The leading edges of the cams angles are low to permit ease of installation; and as the claw approaches the lobe the pressure is increased and as the claw passes the lobe the pressure is decreased placing the assembly in the cam seat 123 or the locked position as shown in FIG. 26. The reverse action removes the claw from the locked position allowing the assembly to be removed from the superstructure.

As shown in FIG. 25 the pairs of cam detents 120, 120 are located adjacent one end of the backing strip. FIG. 28 is similar except that the pairs of detents 120' are located further away from the terminal end portions 131 than in FIG. 25.

It will be understood that the preferred form of backing strip as shown for example in FIGS. 11, 12, 25 and 28 is formed from a single strip-like piece of material preferably spring metal which is bent intermediate its ends to form a pair of strip members which are integrally connected at one end and loosely fitting at their other ends. The locking detents which may be of the form shown for example in FIGS. 11, 12, 25 and 28 may be formed either before or after bending the backing strip and also the loose end portions may be shaped at any suitable stage. This operation has been generally described in connection with FIGS. 11, 12, 24 and 25 and will be more fully described in reference to FIGS. 31–35 inclusive, wherein various steps in connection with the formation of such backing strip will be set forth.

Figure 32:
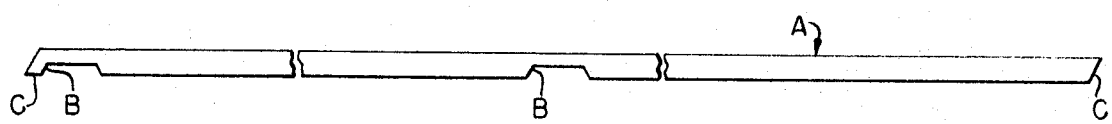
Figure 33:
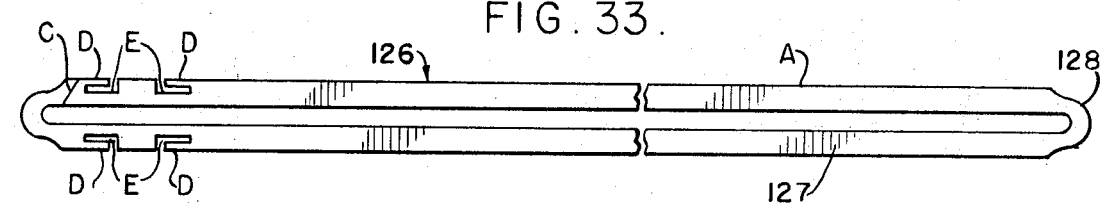
Figure 34:
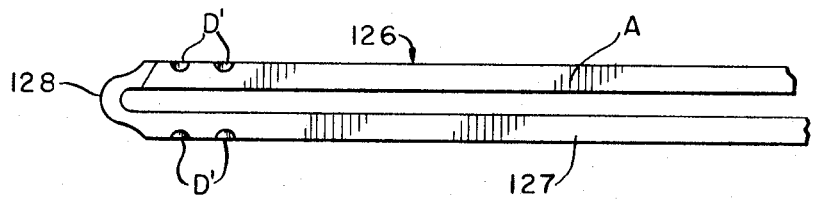
Figure 35:
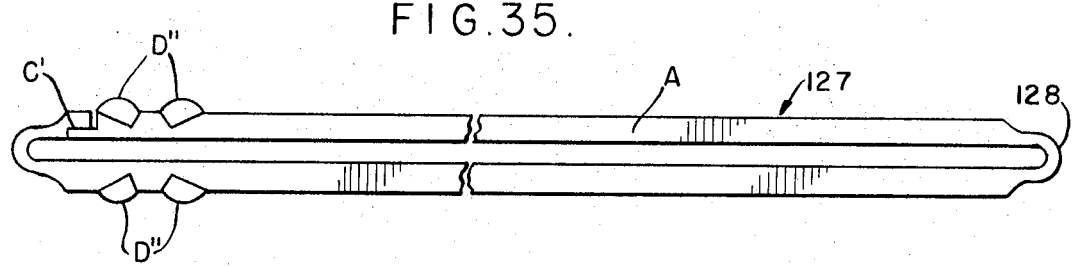

In FIG. 31 a single elongated strip of flexible spring metal is designated by the letter A. In FIG. 32 the strip A is shown as cut away at B and shaped at its ends C prior to the bending operation illustrated in FIG. 33. Either before or after bending pairs of detents D are formed for coaction with the claws 13 of the superstructure as previously described herein. In FIG. 33 the detents are the type shown at 20 in FIG. 11 and are formed by first cutting out an L-shaped portion E after which the spring detents D may be bent outwardly as previously described and as illustrated for example in FIGS. 15 and 20. In FIG. 34 the pairs of detents D', D' are of the concavo-convex boss type shown for example in FIG. 12. In FIG. 35 the pairs of detents D", D" are of the cam type shown in FIGS. 25 and 28 and the free portions C' are shown as provided with a step fit as in FIGS. 25 and 28. As previously indicated the various types of detents may be formed at any stage of the operation, either before or after the strip A (FIG. 31) has been bent to the form shown in FIG. 33 and the detents may be of any suitable form as herein illustrated.

Specifically this improvement deals with a flexer or support member and the means for locking this member to the superstructure.

One object of this improved design is to increase the cross-sectional strength at the locking point of the flexer.

Another feature of this improved installation is the ease at which the garage attendants or station attendants can install a wiper in the superstructure. A most important object of this improvement is to permit moving the material laterally or in a plane parallel to the windshield.

While in the foregoing there have been described and shown various embodiments of the invention, other modifications may become apparent to those skilled in the art to which the invention relates. Accordingly, it is not desired to limit the invention to this disclosure and various modifications and equivalents may be resorted to, falling within the spirit and scope of the invention as claimed.

What is claimed is:

1. For use in a windshield wiper blade assembly including an elongated pressure unit and an elongated detachable blade unit; a thin, flat metal backing strip resiliently flexible in a plane normal to its surface but substantially rigid against lateral deflection, adapted to support a resiliently flexible wiper element, said pressure unit including a plurality of claws adapted to slidably embrace longitudinal edge portions of said backing strip at longitudinally spaced points, said backing strip including claw locking means and means adapted to cooperate with one of said claws for releasably locking the blade unit against sliding relative to the pressure unit, said claw locking means comprising a pair of longitudinally spaced snap-fitting detents provided on at least one longitudinal edge portion of said backing strip, the spacing of said detents corresponding substantially to the longitudinal dimension of said one claw, and said one claw being movable longitudinally of the backing strip to snap-fit into and out of a seated position between said detents, said metal backing strip being of substantially uniform width and thickness between its ends except for said detents and having a substantially straight longitudinal outer edge from which the detents project outwardly with an intervening space between them, each detent comprising a cam member formed integrally with the metal strip and each having one leading cam edge portion sloping outwardly from the adjacent longitudinal edge portion of the strip and each cam member also having a cam edge portion sloping away from the longitudinal edge portion within the space between the detents, whereby said claw may be manually assembled or disassembled from the strip in either direction.

2. A flexible blade backing strip as defined in claim 1 wherein the cam members become thinner as the lateral distance from the adjacent longitudinal edge portion of the strip is increased.

3. A flexible backing strip as defined in claim 1 wherein the slope of the cam surfaces facilitating removal of the claw from the space between the detents is steeper than the slope of the surfaces facilitating entry of the claw into said space.

4. A flexible backing strip as defined in claim 1 wherein said backing strip comprises a pair of flat strip members of substantially uniform width intermediate their end portions with the exception of the detents and substantially uniformly spaced from each other from end to end.

5. A backing strip as defined in claim 4 wherein the component strip members of the backing strip are unconnected at one end except when assembled in a windshield wiper blade assembly.

6. A backing strip as defined in claim 1 wherein the spaced detents are located adjacent one end of the backing strip.

7. A backing strip as defined in claim 1 wherein the spaced detents are substantially removed longitudinally from the ends of the backing strip.

8. A backing strip as defined in claim 5 wherein the spaced detents are located adjacent the unconnected ends of the strip members.

9. A backing strip as defined in claim 5 wherein the spaced detents are substantially removed longitudinally from the free ends of the strip members.

10. A backing strip as defined in claim 1 wherein the cam members project outwardly from the adjacent longitudinal edge and lie substantially within the plane of the backing strip.

References Cited

UNITED STATES PATENTS

| 2,700,785 | 2/1955 | Oishei et al. | 15—250.42 |
| 2,924,840 | 2/1960 | Anderson | 15—250.36 |
| 3,097,389 | 7/1963 | Contant et al. | 15—250.42 |
| 3,104,412 | 9/1963 | Hinder | 15—250.42 |
| 3,141,186 | 7/1964 | Scinta | 15—250.42 |
| 3,178,753 | 4/1965 | Wise | 15—250.42 |
| 3,393,419 | 7/1968 | Scinta | 15—250.42 |

FOREIGN PATENTS

| 1,160,918 | 3/1958 | France | 15—250.42 |

PETER FELDMAN, Primary Examiner